United States Patent [19]

Fitchmun

[11] Patent Number: 5,741,744
[45] Date of Patent: Apr. 21, 1998

[54] THERMOPLASTIC THERMOFORMABLE COMPOSITE MATERIAL AND METHOD OF FORMING SUCH MATERIAL

[75] Inventor: Douglas R. Fitchmun, Woodland Hills, Calif.

[73] Assignee: Thermocomp Corporation, Woodland Hills, Calif.

[21] Appl. No.: 749,989

[22] Filed: Nov. 15, 1996

Related U.S. Application Data

[62] Division of Ser. No. 390,533, Feb. 16, 1995, Pat. No. 5,604,020.

[51] Int. Cl.⁶ .................. B32B 5/18; B32B 5/28
[52] U.S. Cl. .................. 442/16; 442/45; 442/104; 442/105; 442/164; 442/239; 442/255
[58] Field of Search .................. 442/16, 45, 104, 442/105, 164, 239, 255

[56] References Cited

U.S. PATENT DOCUMENTS 4,778,717  10/1988  Fitchman .................. 442/261

*Primary Examiner*—Richard Weisberger
*Attorney, Agent, or Firm*—Charles H. Schwartz

[57] ABSTRACT

A thermoplastic thermoformable composite material for shaping and stretching into a desired form without voids and holes, including a core formed by at least one layer of chopped fibers enveloped and impregnated by thermoplastic material to form a fabric layer. Layers of thermoplastic material respectively positioned on opposite sides of the fabric layer core, and the layers of thermoplastic material provided with a sufficient thickness to flow into and heal any voids or holes formed in the core as the composite material is shaped and stretched into a desired form.

9 Claims, 2 Drawing Sheets

THERMOPLASTIC THERMOFORMABLE COMPOSITE MATERIAL AND METHOD OF FORMING SUCH MATERIAL

This is a division of application Ser. No. 08,390,533 filed Feb. 16, 1995, now U.S. Pat. No. 5,604,020.

BACKGROUND OF INVENTION

1. Field of the Invention

This invention relates to a thermoformable thermoplastic composite sheet material which is strong and light and which is capable of being thermally deformed and stretched to any desired shape without buckling, rippling or tearing of the composite material.

2. Description of Prior Art

It is often desirable to form a sheet of plastic material into a complex shape without any rippling, buckling, or tearing of the material. It is also desirable to make such sheet as light (from a weight standpoint), thin and strong as possible. It is also desirable to form a sheet with the above characteristics into the complex shape in a relatively simple process so that the costs of providing the complex shape in the sheet are low and so that the yield of the final product is high.

A sheet with the properties discussed may have a wide variety of different uses. For example, it may be shaped to form a container, or the sides of a container such as used in air cargo. Other uses may be to form components or portions of a boat or vehicle. Although the examples have been limited to uses in transportation, this is only one of a number of different fields or areas in which such material can be used.

Thermoplastic materials have been used to provide sheets with the properties discussed above. To obtain a desired shape, a mold is provided with the desired shape. The thermoplastic material is then formed into the desired shape by applying heat and pressure to the thermoplastic material to move the material into the mold and to have the material adopt the configuration of the mold. Suitable materials for forming into complex shapes may be any thermoplastic polymer including acrylics, ABS, polyolefins, nylon and polycarbonates and the engineering thermoplastic such as polysulfones and PBT (polybutyleneteraphthalate, and the new thermoplastic resins such as PEEK (polyetheretherketone), PEKK (polyetherketoneketone) etc.

Thermoplastic materials are advantageous because they can be reshaped if it is desired to change the configuration somewhat after the material has been initially shaped through the application of heat and pressure. However, thermoplastic materials are distinctly disadvantageous in that they have to be provided with a considerable thickness in order to provide the necessary rigidity. For example, thicknesses of 0.120" to 0.200" may be required. Unfortunately, such thick materials are heavy and weight is a disadvantage in transportation. Furthermore, the thermoplastic materials are not as durable and resistant to breaking as would otherwise be required.

Thermosetting materials that contain reinforcing fibers have been used to provide complex shapes. An advantage of a thermosetting material is that they can be made quite thin to obtain the desired shape. For example, the thickness of the thermosetting material may be in the order 0.125" and be as stiff as material 0.200". One problem with shaping thermosetting materials into complex shapes is that the thermosetting materials have to be shaped properly the first time. The reason is that the thermosetting materials cannot be reshaped after they have been heated to a temperature for initially shaping the material. This problem has limited the use of thermosetting material to provide large complex shapes. "Another problem often is that the weight of the thermosetting material tends to be heavy and irregular even though the part is thin."

Fiberglass is a thermosetting material that uses styrene based polybutylene resin glass as a reinforcement. "Open Molding" is used to fabricate large "fiberglass" parts for businesses traditionally needing modest production volumes. Part costs for such open molding are growing rapidly because throughput is slow, labor content is high and open molding is unfriendly to man and his environment. One reason fabricators keep using "fiberglass" is familiarity. It was developed in the late 40's. Raw materials are inexpensive and make good structural parts. Tooling is cheap and is made rapidly. Another reason for the use of "fiberglass" is the lack of viable alternatives. Unfortunately, rising part costs, worker's health and environmental issues are fundamental problems with "fiberglass". These problems can not easily be resolved.

Matched metal mold technology which uses similar styrene containing materials is available. It uses heated molds to rapidly cure material. This reduces health and environmental issues and eliminates hazardous waste. However, it is too expensive to be competitive at production volumes needed for open molded parts.

The fiberglass technology is based on open air curing (polymerizing) of styrene. Parts are made by painting a styrene containing polyester resin onto glass fabric. This fabric/resin layer is built up on a mold surface to the needed thickness. The parts harden within 4 hours.

Part fabrication using fiberglass technology is labor intensive and costs are rising. The labor cost can be 50% and greater of the cost of goods. The fiberglass process is unfriendly to workers and their environment. Styrene is volatile and the chemically reactive material mix effects workers as follows:

1. Workers Health Worker's Compensation Insurance rates are higher for workers, who inhale styrene daily. It is known that aromatic chemicals like styrene damage liver and kidney. Styrene is a possible carcinogen and is on the IRAC watch list.

2. Air Pollution Styrene pollutes the air. Emissions are regulated by permit. Company growth can be stopped if all permit capacity for a given plant is in use.

3. Hazardous Waste Disposal The chemically reactive mix forms a hazardous waste. Disposal fees are rapidly increasing as dump sites get scarce.

Thermoforming parts from glass or other fiber reinforced thermoplastic sheet would be an alternative to "fiberglass technology", but this new concept has unresolved technical problems. The thermoforming aspect is an old fabrication technology which started in the 1950's. This technology is used to form parts in modest production volumes. It offers low labor costs, fast forming cycles and low cost tooling. It uses vacuum to form parts from heat softened thermoplastic sheet that is clamped in a frame on top of the mold. Plastics include polyolefines, acrylics, ABS, polycarbonate nylons, etc. The problem is with materials. The fiber reinforced thermoplastic sheets available today, are not adequate for the job of thermoforming acceptable parts.

Todays Sheet Products

At first glance, the extrusion process, for making general purpose thermoplastic into sheet, would appear to be a feasible way of making fiberglass filled sheet. This is not often done because glass fiber is abrasive and causes excessive wear on equipment. Also this process significantly reduces fiber length in the extruded sheet and therefore material properties.

DuPont and GE use proprietary manufacturing technologies to produce sheet. There are five classes of glass fiber reinforced thermoplastic sheet available today—three from GE: "Azdel", "Azmet" and "Azloy" and two from DuPont: "LDF" and "XTC".

All classes of these sheet materials have three features in common.

1. All are based on thermoplastic resins.
2. All contain short fibers varying between 0.5" to 3.0" long which can be carbon, Kevlar or glass.
3. All have their materials more or less uniformly distributed throughout the sheet.

As stated above, thermoforming uses a vacuum to stretch heat softened thermoplastic sheet into all mold contours. These materials do not stretch adequately. In particular, stretching tears holes in the sheet and allows air to go through. This aborts stretching before a part is completely filled out. For thermoforming, resistance to "holing is a basic sheet material property.

Surface properties degrade during stretching: glossiness, flatness and level of porosity is not competitive to that achieved by Open Molding. An inspection of product literature from GE and DuPont shows that all were designed to be molded, even though they are sold in sheet form and are described as thermoformable. Traditionally, thermoforming uses a vacuum and a one surface mold to make a part. Furthermore, the material is softened for stretching. It is not melted for molding. The available sheets require heated, matched metal molds and pressures up to 6,000 psi. to force materials to flow.

All of the available materials fail by the same mechanism. In particular, when pulled, the hot sheet begins to stretch. Further stretching causes some fibers to pull apart (delaminate) from their neighbor fibers. Delamination allows air to enter the sheet through the voids between neighboring fibers. Holes develop in the hot sheet when voids between surfaces connect. Once a sheet has a hole, vacuum is lost and stretching stops before a part is finished being formed.

It therefore appears that delamination is a natural step in thermoforming any reinforced thermoplastic material as the fibers move into new positions. For the available composite sheet hole forming during stretching is also natural particularly when stretching increases sheet area greater than about of 5%. Based on the above, it does not appear that the commercial materials available today are satisfactory for thermoforming.

U.S. Pat. No. 4,778,717 issued to me on Oct. 18, 1988, for a Thermoplastic Thermoformable Composite Material" discloses and claims a composite thermoplastic material which can be easily formed, and even reformed if necessary, at elevated temperatures to desired complex shapes. The composite material is light and strong and is able to be thermally deformed, and even reformed, to desired shapes with relatively minimal buckling or rippling. Because of the structure of the composite material of the U.S. Pat. No. 4,778,717, there are limitations in the forming of large complex shapes without buckling, rippling or tearing since the material has very limited stretching abilities. U.S. Pat. No. 4,778,717 is made of reference to provide a background for this invention and also to complete any disclosure in this application of the construction and formation of the composite material. In addition, reference is made to a number of improvement patents to U.S. Pat. No. 4,778,717, all listing me as co-inventor. These are U.S. Pat. Nos. 5,236,776 issued on Aug. 17, 1993; 5,338,600 issued on Aug. 16, 1994; and 5,354,604 issued on Oct. 11, 1994.

The composite material of U.S. Pat. No. 4,778,717 is formed from a core material of a thermoplastic resin material and a pair of layers of fabric material disposed on the opposite sides of the core material. Layers of a thermoplastic material envelope and impregnate the layers of the fabric material and bonds the layers of the fabric material to the core. The layers of the fabric material have a total thickness sufficient to impart strength and rigidity to the composite material. The core is of a sufficient thickness to provide for a shaping of the composite thermoplastic material at an elevated temperature to desired shapes or configuration with relatively little rippling or buckling of the fabric material. The composite material of U.S. Pat. No. 4,778,717 has received widespread acceptance for orthotics and shoe components.

SUMMARY OF THE INVENTION

This invention provides a thermoplastic thermoformable composite material which constitutes an improvement for particular uses over the composite material of U.S. Pat. No 4,778,717. In one embodiment of the invention, a layer of fabric material is impregnated with thermoplastic thermoformable resin material to define a core of a fabric material covered with layers of resin material. The structure is sufficiently thick to provide for a shaping of the composite material at an elevated temperature to any desired configuration. The fabric material may be formed of glass, carbon or aramid and may be formed from chopped fibers or random strand mats. The fabric layer has a total thickness sufficient to impart strength and rigidity to the composite material.

In one embodiment of the invention, thicker layers of a thermoplastic thermoformable resin material also may be disposed on the opposite sides of the fabric material. These thicker thermoplastic layers also impregnate the fabric layer and provide a smooth external surface to the composite material. The thermoplastic layers are of a sufficient thickness to supply excess resin during thermoforming to flow into and plug any voids that form during thermoforming.

Other embodiments of the invention include additional layers of fabric and resin to form composite material of 5 or more layers of alternating fabric and resin layers.

The present invention provides a solution to "holing" by redesigning the sheet as compared to the prior art including my prior patents. One way is to laminate a thick layer (0.030" or greater) of pure resin to each side of the composite. This makes a three layer sandwich. Excess resin is now available during delamination to flow into voids and plug them as they form. If the composite material is to be formed into a final part with light to no thermoforming, then the outer layers of resin covering and impregnating the fabric core may be thinner (less than 0.030") since a lessor amount of resin will be required to flow into any voids.

A working analogy for the present invention is found in tires that resist going flat. These tires use a coating of flowable plastic material applied on their inside walls. Material fills holes as punctures occur and prevents air from escaping and the tire from going flat.

Sandwich structures have been used previously by Medical Materials Corporation (MMC) the assignee of my previous patents to make thermoplastic composite sheet bend formable. Since 1987, MMC has been selling carbon fiber containing sheet and parts to podiatry and footwear customers. In the present invention the use of a sandwich structure to make a thermoplastic composite sheet thermoformable by stretching is unique when compared to the prior art including my previous patents.

Stretching uses the principal of conservation of volume. For example, when one sq. ft. of a thermoplastic having a suitable thickness is pulled in both the length and width direction, the surface area increases and the thickness decreases. The thickness decreases proportionally to the increase in both length and width. This means that the volume of material in one square foot is the same after stretching as before stretching. The sandwich structures of my prior patents can not stretch acceptability because they were not designed to stretch since the fabric layers were designed to slide relative to a core member.

In particular, the prior art sandwich technology can not stretch since the sandwich will not elongate when pulled in the length or width direction because of the use of long fibers. Even if the fibers are short this deficiency exists because there is no viable healing mechanism for hole repair. Specifically, the prior art sandwich cannot heal voids since this sandwich has the reverse construction. The prior art sandwich consists of two fabric layers, one on either side of a thermoplastic core.

Because of the above, the prior art sandwich can make parts by bend forming only since the prior art sandwich uses a different mechanism to make parts. When warm, this resin core softens and allows the skins to slide smoothly by each other in response to shaping stresses from bending. Sheets make wrinkle free parts for relatively small shaped applications such as podiatry or footwear. Larger parts are progressively more difficult to make wrinkle free.

The present application can be realized using a number of embodiments of thermoplastic composite sheet sandwich products all of which stretch.

Figure 1:
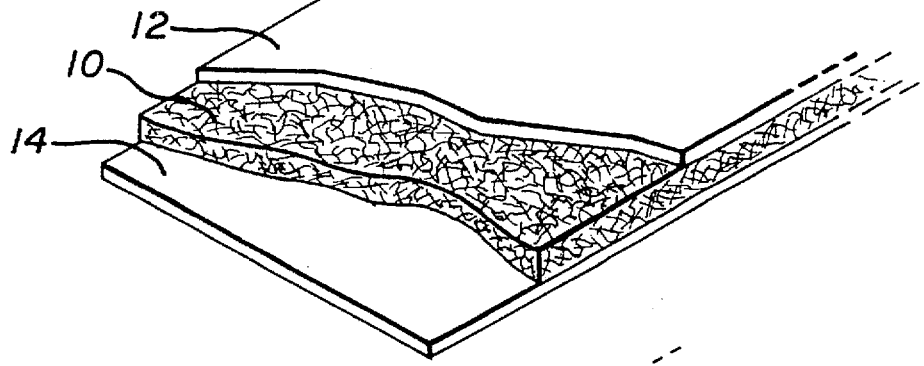
FIG. 1 is a fragmentary schematic perspective view of a first embodiment of the thermoplastic composite material of this invention in sheet form.

FIG. 1 illustrates a sandwich made by laminating a preform constructed from a single layer of prepreg or fabric 10. The prepreg is randomly chopped glass fibers impregnated with resin. In the case of chopped oriented prepreg this will be increased to two layers, where the glass fibers are positioned 0 and 90 degrees to each other. Thin layers 12 and 14 of resin are formed on either side of the prepreg. The fabric layer may be in the order of 40 to 80 mils and the resin layers 12 and 14 may be in the order of 10 to 30 mils each. This sheet construction may be used when the final part is formed with light to no thermoforming.

Figure 2:
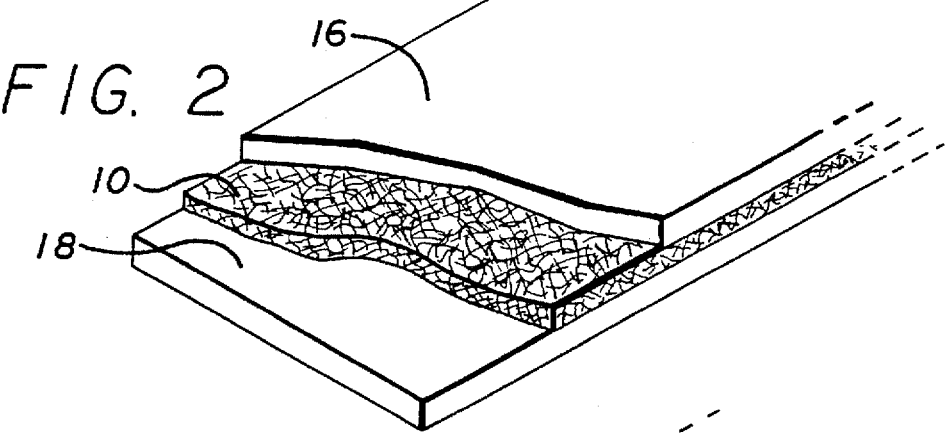
FIG. 2 is a fragmentary schematic perspective view of a second embodiment of the thermoplastic composite material of this invention in sheet form.

FIG. 2 illustrates a sandwich made by laminating a preform constructed from a layer of prepreg 10 and two layers 16 and 18 of solid resin sheet having equal thickness, one on either side of the prepreg layer. The prepreg or fabric layer may be in the order of 40 to 80 mils and the resin layers 16 and 18 may be in the order of 30 to 50 mils each. This sheet construction may be used when the final part is formed with heavy thermoforming.

Figure 3:
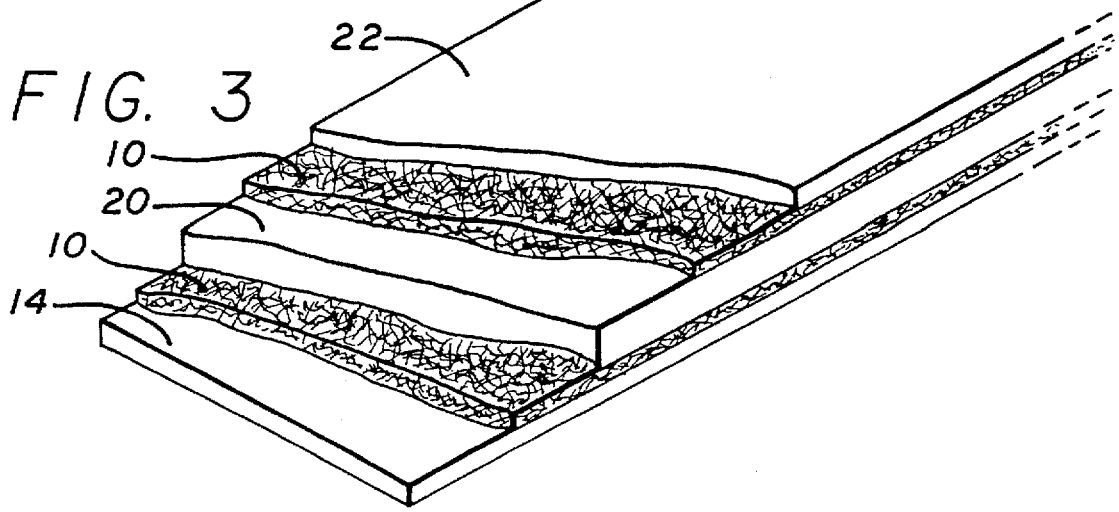
FIG. 3 is a fragmentary schematic perspective view of a third embodiment of the thermoplastic composite material of this invention in sheet form.

FIG. 3 illustrates a sandwich made by laminating a preform constructed from two layers of prepreg 10 of the same composition, one on each side of a thick solid sheet of resin 20. Two more sheets of solid resin 22 and 24 of equal thickness to each other and about half the thickness of the center resin sheet are added, one on each side of the prepreg. The prepreg or fabric layers may be in the order of 30 to 80 mils, the resin layer 20 in the order of 60 to 120 mils and the layers 22 and 24 in the order of 30 to 60 mils. It will be appreciated that additional layers of fabric and resin may be added if desired to increase the stiffness and strength of the final sheet construction.

Figure 4:
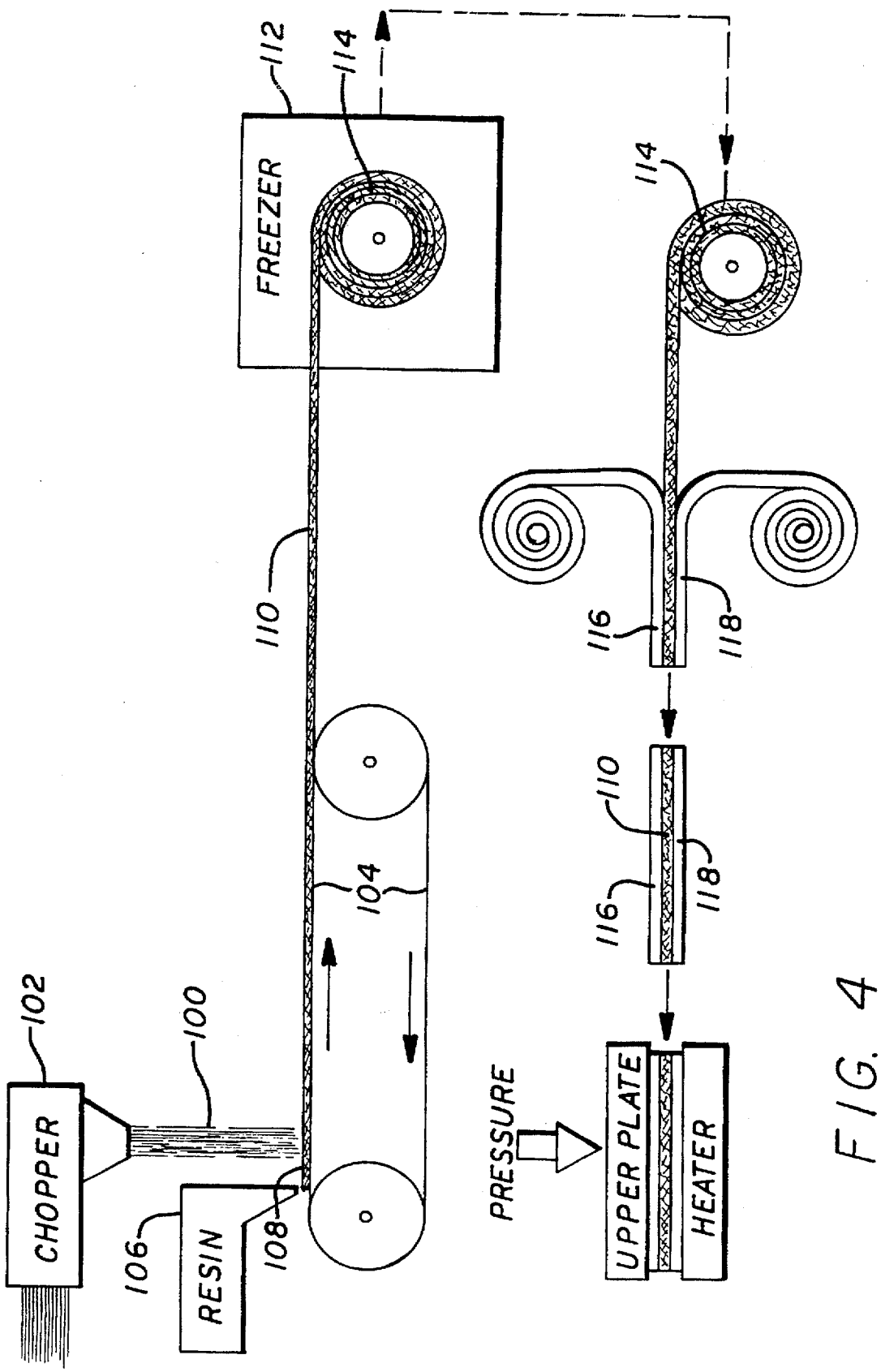
FIG. 4 is a view schematically illustrating a method of forming the thermoplastic sheet material shown in FIG. 2.

The manufacturing process for making the thermoplastic composite sandwich sheet of the present invention is unique since the more conventional methods do not work. The sheet is produced by the following steps illustrated in FIG. 4.

Step 1. The glass fibers 100 are prepared by chopping dry glass roving and then dropping the chopped fibers onto a resin coated moving belt of polyethylene film 104. The resin is initially contained in a storage chamber 106 and is deposited as a layer 108 on the film 104. Fibers can be varied in length from 0.25" on up to 4.00" and by weight. Also the fibers can be placed in the prepreg in two patterns, random or oriented. The prepreg or fabric layer 110 is thereby formed.

Step 2. Prepreg 110 is stored in a freezer 112 either as cut and stacked sheets or on rolls 114. Storage temperatures are to be kept below 15 degrees F.

Step 3. Prepreg 110 is converted into cured sandwiches by laminating layers of resin 116 and 118. The conditions presented are approximate. Temperature is 220 degrees F. Cure time is about 30 minutes. Pressures are time sequenced: p1=0 psi t1=5 min, p2=35 psi t2=3 min, p3=110 psi p3=25 min. This is for making a 4'×8' panels at two per press opening.

Lay up Preform construction relates to the product being made and three specific examples of sandwich products are described above in FIGS. 1, 2 and 3.

Thermoplastic composite sheet of the present invention can replace the industry standard "fiberglass" which is a thermosetting material consisting of glass fibers and polyester resins. Structural properties of "fiberglass" are routinely modified by changing glass content and glass construction. As a point of comparison between the two technologies, samples of sheet of the present invention containing random glass and oriented glass fibers are compared to 0.125" "fiberglass". This thickness is used in 40 to 50% of all "fiberglass" parts. Performance comparisons are shown below in Table 1 for sheet formed of oriented glass fibers.

TABLE 1

PERFORMANCE COMPARISONS
(Fiber glass vs "Thermoplastic Composite Sheet (TCS)"

| Properties | "Fiberglass"[1] (Random FG) | "TCS"[2] (Oriented FG) | TCS (Random FG) |
| --- | --- | --- | --- |
| Thickness (0.000 ins.) | 0.125 | 0.100 | 0.135 |
| Flexural Str. ($10^3$ psi) | 20,000 | 34,900 | 27,000 |
| Flexural Mod. ($10^6$ psi) | 1.40 | 2.34 | 1.30 |
| Rigidity (lbs. in.$^2$) | 240.4 | 229.7 | 225.0 |
| Tensile Str. ($10^3$ psi) | 10,000 | 10,018 | 8,900 |
| Tensile Mod. ($10^6$ psi) | 1.40 | 1.39 | — |
| Areal Density (lbs./ft.$^2$) | 1.0 | 0.8 | 0.90 |

TABLE 1-continued

PERFORMANCE COMPARISONS
(Fiber glass vs "Thermoplastic Composite Sheet (TCS)"

| Properties | "Fiberglass"[1] (Random FG) | "TCS"[2] (Oriented FG) | TCS (Random FG) |
|---|---|---|---|

Notes:
[1] Ref. for glass/polyester: Modern Plastics '92, p 406 Column 6 (premix chopped glass). Glass content assumed, 30–35% by weight.
[2] "TCS" test and methods are ASTM.

Oriented glass fibers 1. stronger with higher modulus in bending at 0.100" thick than glass/polyester is at 0.125" thick.
2. slightly less rigid in bending at 0.100" than glass polyester is at 0.125'.
3. is 20% lighter at approximately the same performance.
4. is 20% thinner at approximately the same performance.

Random Glass Fibers

1. Is 5% to 10% lighter at approximately the same performance.
2. Stronger and slightly thicker.

In addition to the structural advantages described above, the present invention realizes a number of process benefits as follows:

1. Rapid fiberglass part fabrication-3 to 5 min./part starting with cold sheets as compared to hrs. for open molding.
2. Low labor content parts (as low as 15% of COG) with finished "as molded" surfaces comparable to open molding.
3. Environmentally friendly sheet materials. Health and safety are not an issued for workers in thermoforming companies nor is the environment or solid waste disposal.
4. Inexpensive tooling—low pressure process requires only (1) one tool surface/part, made from low cost material.
5. New Products to Market Rapidly-tooling can be made rapidly.

Although this invention has been described with reference to particular embodiments, it is to be appreciated that various adaptations and modifications may be made and the invention is only to be limited by the appended claims.

I claim:

1. A thermoplastic thermoformable composite material for shaping and stretching into a desired form without voids and holes, including a core including at least one layer of chopped fibers enveloped and impregnated by thermoplastic material to form a fiber layer core, layers of thermoplastic material respectively positioned on opposite sides of the fiber layer core, the layers of thermoplastic material being provided with a sufficient thickness to flow into and fill any voids or holes formed in the core as the composite material is shaped and stretched into a desired form, and two fiber layers are provided to form two cores and three layers of thermoplastic material are provided to form a central layer of thermoplastic material with fiber layer cores positioned on opposite sides of the central layer and with two further thermoplastic layers positioned on the outside surfaces of the fiber layer cores and with the central layer of thermoplastic material thicker than either of the thermoplastic layers.

2. The thermoplastic thermoformable composite material of claim 1 wherein each fiber layer core has a thickness in the range of 30 to 80 mils, the central layer of thermoplastic material has a thickness in the range of 60 to 120 mils and the two further thermoplastic layers have a thickness in the range of 30 to 60 mils.

3. The thermoplastic thermoformable composite material of claim 1 including additional layers of fiber layer and thermoplastic material.

4. A thermoplastic thermoformable sandwich construction, including a fiber impregnated core formed by chopped fibers enveloped and impregnated by thermoplastic material and having first and second opposite flat surfaces, a first layer of thermoplastic material disposed on the first flat surface of the fiber impregnated core, a second layer of thermoplastic material disposed on the second flat surface of the fiber impregnated core, the first and second layers of thermoplastic material provided with sufficient thickness to flow into and fill holes or voids formed in the fiber impregnated core during thermoforming, and two fiber impregnated cores are provided to form two cores and three layers of thermoplastic material are provided to form a central layer of thermoplastic material with fiber impregnated cores positioned on opposite sides of the central layer and with two further thermoplastic layers positioned on the outside surfaces of the fiber impregnated cores and with the central layer of thermoplastic material thicker than either of the further thermoplastic layers.

5. The thermoplastic thermoformable sandwich construction of claim 4 wherein each fiber impregnated cores has a thickness in the range of 30 to 80 mils, the central layer of thermoplastic material has a thickness in the range of 60 to 120 mils and the two further thermoplastic layers have a thickness in the range of 30 to 60 mils.

6. The thermoplastic thermoformable sandwich construction of claim 4 including additional layers of fiber impregnated core and thermoplastic material.

7. The thermoplastic thermoformable sandwich construction of claim 4 wherein the chopped fibers are at least one quarter inch (0.25) long.

8. The thermoplastic thermoformable sandwich construction of claim 7 wherein the chopped fibers have length in the range of 0.25 to 4.00" inches long.

9. The thermoplastic thermoformable sandwich construction of claim 4 wherein the chopped fibers are positioned randomly in the fiber impregnated core.

* * * * *